(12) United States Patent
Silva (10) Patent No.: US 9,027,194 B2
(45) Date of Patent: May 12, 2015

(54) SPATULA APPARATUS

(71) Applicant: Anthony P. Silva, Sayreville, NJ (US)

(72) Inventor: Anthony P. Silva, Sayreville, NJ (US)

(73) Assignee: SpeegeeCo, LLC, Sayreville, NJ (US)

( * ) Notice: Subject to any disclaimer, the term of this patent is extended or adjusted under 35 U.S.C. 154(b) by 0 days.

(21) Appl. No.: 14/250,889

(22) Filed: Apr. 11, 2014

(65) Prior Publication Data

US 2014/0215743 A1     Aug. 7, 2014

(51) Int. Cl.
  *A47J 43/28* (2006.01)
  *A47L 17/06* (2006.01)

(52) U.S. Cl.
  CPC ............... *A47J 43/288* (2013.01); *A47L 17/06* (2013.01)

(58) Field of Classification Search
  USPC ......... 15/236.01, 236.05–236.09, 245, 245.1; 30/169; 294/7, 176; D7/688; D32/41, D32/46, 49
  See application file for complete search history.

(56) References Cited

U.S. PATENT DOCUMENTS

| | | | | |
|---|---|---|---|---|
| 1,130,281 A | * | 3/1915 | Hay | 15/236.01 |
| D57,845 S | * | 5/1921 | Lickert | D7/688 |
| 1,401,457 A | * | 12/1921 | Beuckmann | 15/245 |
| 1,926,944 A | * | 9/1933 | Hester | 30/169 |
| 2,485,521 A | * | 10/1949 | Wendt | 294/7 |
| 2,860,858 A | * | 11/1958 | Kurs | 366/129 |
| 2,901,762 A | * | 9/1959 | Bell | 15/245 |
| D191,526 S | * | 10/1961 | Marcus | D7/688 |
| D266,476 S | * | 10/1982 | Thomasson | D7/688 |
| D304,144 S | * | 10/1989 | Gecchelin | D7/688 |
| D318,989 S | * | 8/1991 | Risner | D7/688 |
| 5,491,869 A | | 2/1996 | Sullivan et al. | |
| D618,521 S | | 6/2010 | Jalet et al. | |
| 2004/0231087 A1 | * | 11/2004 | Siegel et al. | 15/236.09 |
| 2004/0232712 A1 | | 11/2004 | Siegel et al. | |

FOREIGN PATENT DOCUMENTS

JP        8-322781        * 12/1996

OTHER PUBLICATIONS iSi Basics Silicone Slim Spatula, White by iSI North America, available online at www.amazon.com.
Silicone Slim Spatula—Red. Item No. B10101 by SureSource LLC iSi North America available at: www.isi-store.com.

* cited by examiner

*Primary Examiner* — Mark Spisich
(74) *Attorney, Agent, or Firm* — Patentfile, LLC; Bradley C. Fach; Steven R. Kick (57) ABSTRACT

It is one aspect of the present invention to provide an improved spatula apparatus configured to contact a substantial portion of container sidewalls. Another object of the present invention is to provide improved spatula apparatuses that are configured to hold and remove a larger amount of material from containers that have relatively small openings. An additional object of the present invention is to provide improved spatula apparatuses that are configured to conform to and remove material from a plurality of containers without requiring multiple swipes and other duplicative motions.

10 Claims, 7 Drawing Sheets

SPATULA APPARATUS

FIELD OF THE INVENTION

The present invention generally relates to the field of spatulas. More specifically, the invention relates to improved spatulas for removing residual material from the interior of containers.

BACKGROUND OF THE INVENTION

Spatula utensils have long been employed in food preparation. Often described as indispensible, they are used in a variety of situations, from mixing ingredients to dispensing foods. Spatula utensils may also be used in a wide variety of non-food preparation applications. These applications may include compounding or medical uses, where the spatula is used to mix drugs, other chemical compounds, liquids, and other ingredients. The spatula is commonly used in situations where a flexible tool is desired to remove as much material sticking to the side of a container as possible.

Food spatula utensils found in the prior art, typically are comprised of a handle made from rigid or slightly flexible material and a spatula head, positioned at the end of the handle, made from a resilient material that conforms to the sides of containers. The resilient spatula head often has a pointed, right-angled edge and a rounded edge at its farthest extension.

The feature common to spatulas in the prior art is that the spatula head is generally one fifth to one fourth the length of the entire utensil. This allows the spatula head to be maneuvered in a variety of orientations. However, in larger containers, multiple swipes and duplicative motions may be required to remove the desired amount of material that is adhered to the sides of the container. This feature also hinders the amount of material that the spatulas may hold, further necessitating multiple swipes. While there may be larger spatula devices, their size is limited by the opening of the desired container.

Therefore, a need exists for improved spatula apparatuses that are configured to contact greater portions of container sidewalls. There is a further need for spatula apparatuses that are configured to hold and remove a larger amount of material from containers that have relatively small openings. Finally, there exists a need for spatula apparatuses that are configured to conform to and remove material from a plurality of containers without requiring multiple swipes and other duplicative motions by a user.

BRIEF SUMMARY OF THE INVENTION

It is one aspect of the present invention to provide an improved spatula apparatus configured to contact a substantial portion of container sidewalls. Another object of the present invention is to provide improved spatula apparatuses that are configured to hold and remove a larger amount of material from containers that have relatively small openings. An additional object of the present invention is to provide improved spatula apparatuses that are configured to conform to and remove material from a plurality of containers without requiring multiple swipes and other duplicative motions.

In preferred embodiments, the spatula apparatus comprises: a spatula head and a handle with the handle coupled to the spatula head. In further embodiments, the front and back of the head are in parallel planes with their perimeters being bound by a major side edge, a bottom edge, a minor side edge, an abutment plateau, a grip ridge, and the top end. In yet further embodiments; the major side edge extends from the top end to a first corner which forms the intersection of the major side edge and the bottom edge. The bottom edge also intersects with the minor side edge at the second corner. The abutment plateau may join the minor side edge to the grip ridge, with the grip ridge intersecting with the top end. The major side edge may be configured to generally extend more than one half the length of the entire spatula apparatus with the minor side edge and the bottom edge configured to generally extend less than one half the length of the major side edge.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It should also be understood that the terms "right" versus "left" and "front" versus "back" are used solely to denote opposing sides or positions of an element of an improved spatula apparatus, and should not unnecessarily be construed as limiting the position or orientation of said element.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New improved spatula apparatuses are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIGS. 1-7 illustrate an example of an improved spatula apparatus ("the apparatus") 100 according to various embodiments. In this example, the apparatus 100 comprises a handle 11 (FIGS. 1-6) and a spatula head 12 (FIGS. 1-7) sometimes called the "head". The handle 11 may be made from rigid or substantially rigid materials such as wood, metal alloys, hard plastics, resins, hard rubbers, carbon fiber, or any other substantially rigid material or combinations of materials. The spatula head 12 is preferably made from flexible and resilient materials such as soft rubber, soft plastics, silicone, or any other substantially flexible and resilient material or combinations of materials common in the art. In some embodiments, the spatula head 12 may comprise an inner substantially rigid material that is surrounded and covered by a substantially flexible and resilient material. In preferred embodiments, the handle 11 may be molded into the head 12 or attached through chemical bonding, heat bonding, or any other suitable joining method.

As perhaps best shown by FIGS. 2, 3, 5, 6, and 7, the head 12 comprises a substantially planar front 13 and parallel positioned substantially planar back 14. The top end 15 (FIGS. 1-6) forms the upper terminus of both the front 13 and the back 14 and is where the handle 11 (FIGS. 1-6) may be joined to the head 12. In some embodiments, the top end 15 of head 12 joins the front 13 and back 14 with angled edges, tapered edges, round edges, pointed edges, or square edges.

In preferred embodiments and as shown by example in the figures, the apparatus 100 also comprises an elongate major side edge 16 (FIGS. 1-4, and 6) which may be configured to be the largest terminus along a lateral side of the head 12 where the front 13 and back 14 meet in a tapered manner forming a tapered end zone suitable for allowing the elongate major side edge 16 to act as a squeegee. The elongate major side edge 16 may extend longitudinally along a substantial portion of the apparatus 100. As used herein the term longitudinally shall generally refer to the direction from the top of the handle 11 to the bottom of the bottom edge 18 (i.e. from top to bottom of the spatula). In preferred embodiments, the major side edge 16 may be configured to extend more than one half (i.e. at least 50%) the longitudinal length of the apparatus 100 as measured from the top end of the handle 11 that is farthest from the head 12 to the bottom edge 18 (FIGS. 1-5, and 7) of the head 12. In other embodiments, the major side edge 16 may be configured to be between one half and nine tenths the entire longitudinal length of the apparatus 100 as measured from the top end of the handle 11 that is farthest from the head 12 to the bottom edge 18.

A minor side edge 17 (FIGS. 1, 2, 4-7), which is shorter in length relative to the length of the major side edge 16, may be configured to be a shorter terminus along a side of the head 12 and disposed opposite the major side edge 16 where the front 13 and back 14 of head 12 meet. The minor side edge 17 may extend along a longitudinal portion of the apparatus 100 and is preferably shorter in length than the major side edge 16. In preferred embodiments, the minor side edge 17 may be configured to extend one half or less (i.e. less than 50%) the entire longitudinal length of the apparatus 100 or even the major side edge 16. In other embodiments, the minor side edge 17 may be configured to be between one fifth and one half the entire length of the entire length of the major side edge 16.

Figure 1:
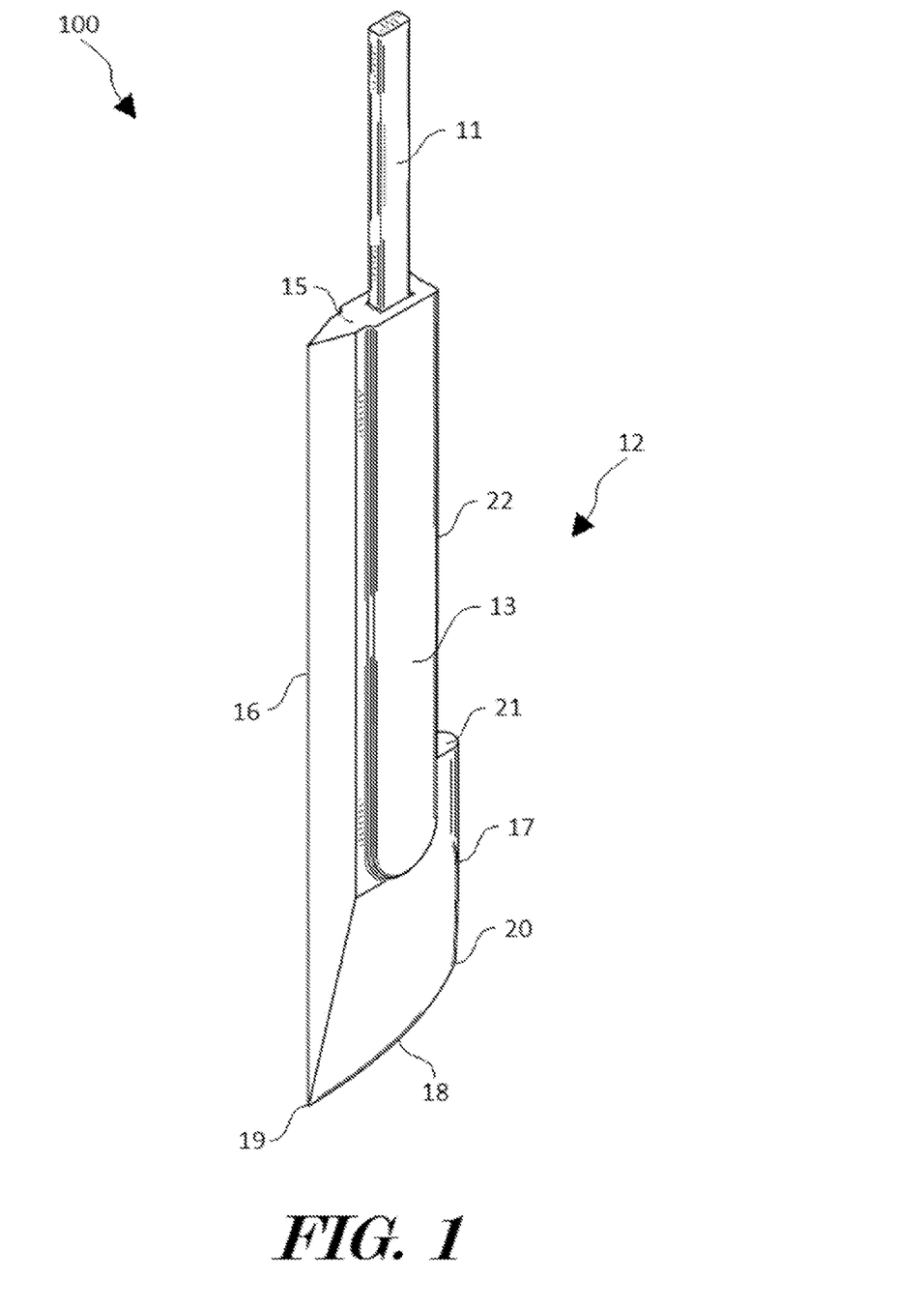
FIG. 1 depicts a rear perspective view of an example of an improved spatula apparatus according to various embodiments described herein.
Figure 2:
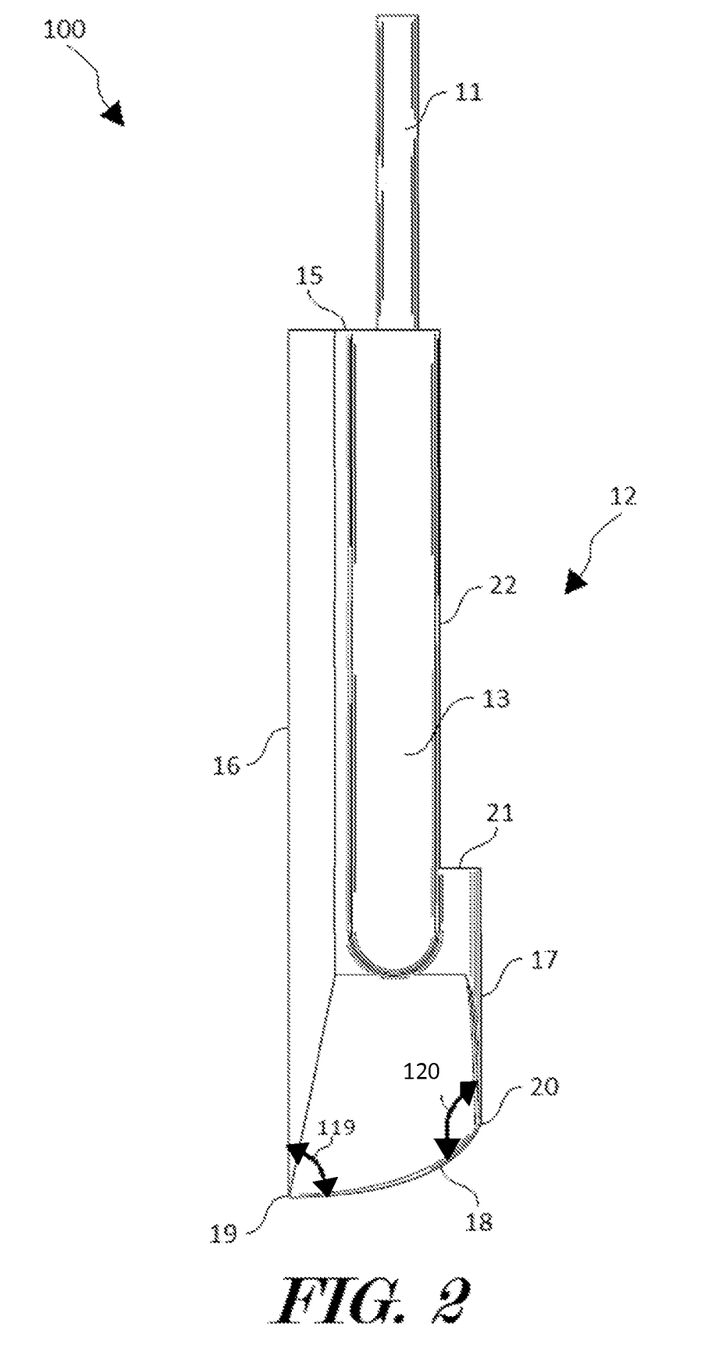
FIG. 2 illustrates a plan view of the front of an example of an improved spatula apparatus according to various embodiments described herein.
Figure 3:
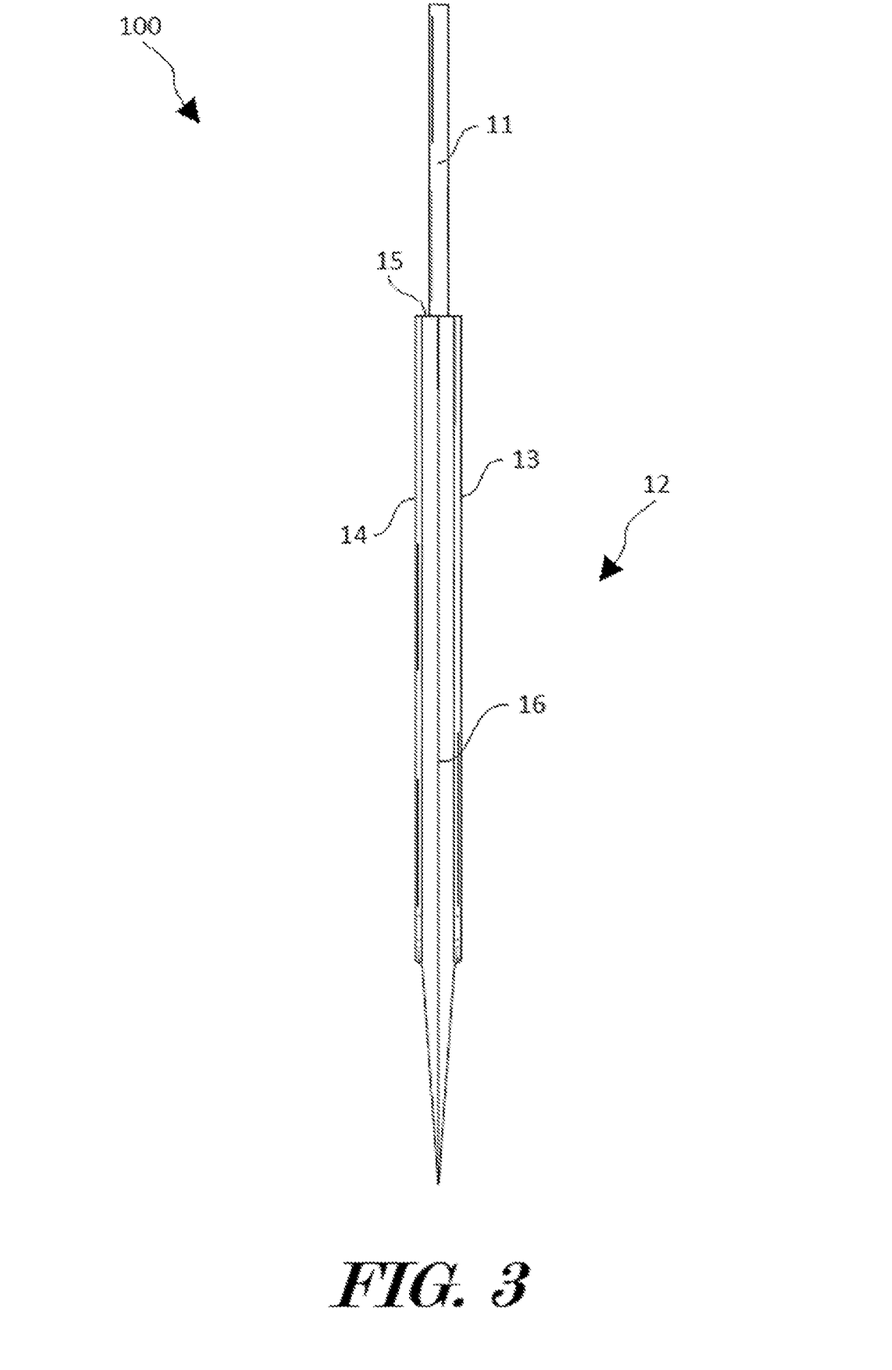
FIG. 3 shows an elevation view of the side of an example of an improved spatula apparatus according to various embodiments described herein.
Figure 4:
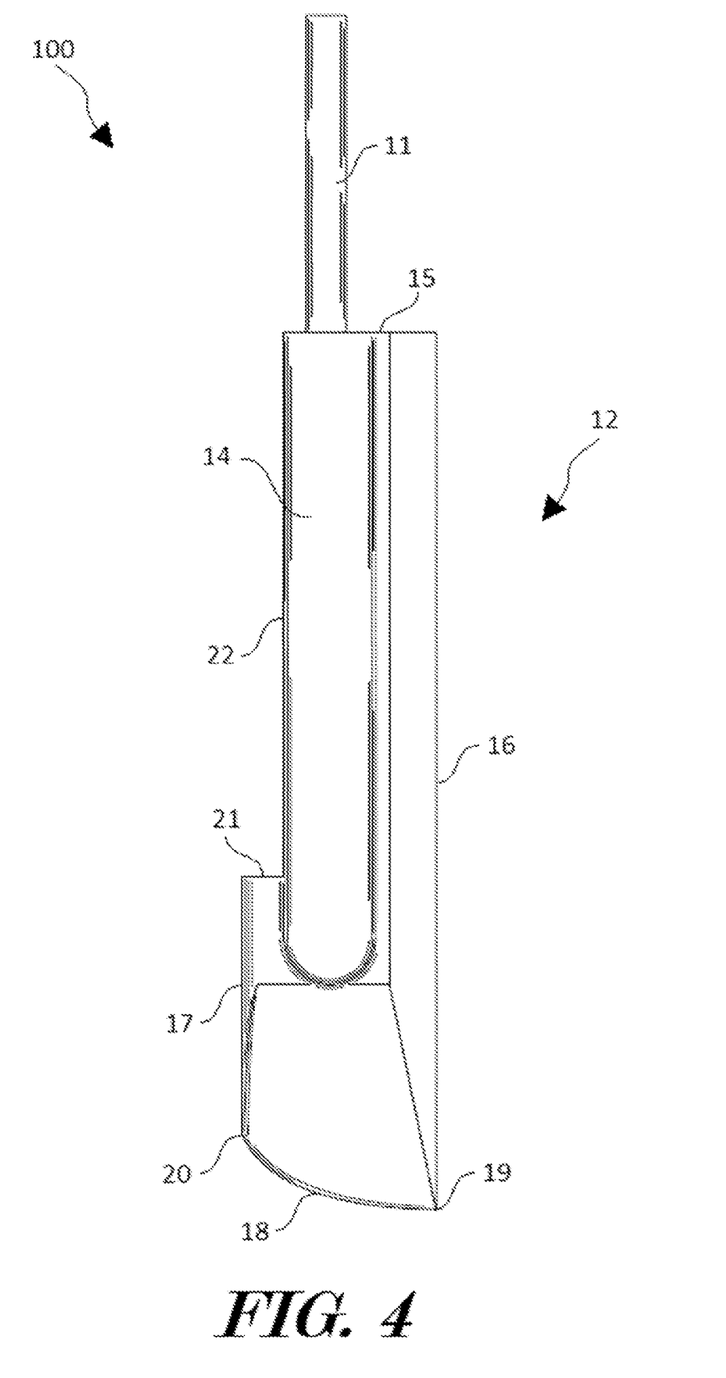
FIG. 4 depicts a plan view of the back of an example of an improved spatula apparatus according to various embodiments described herein.
Figure 5:
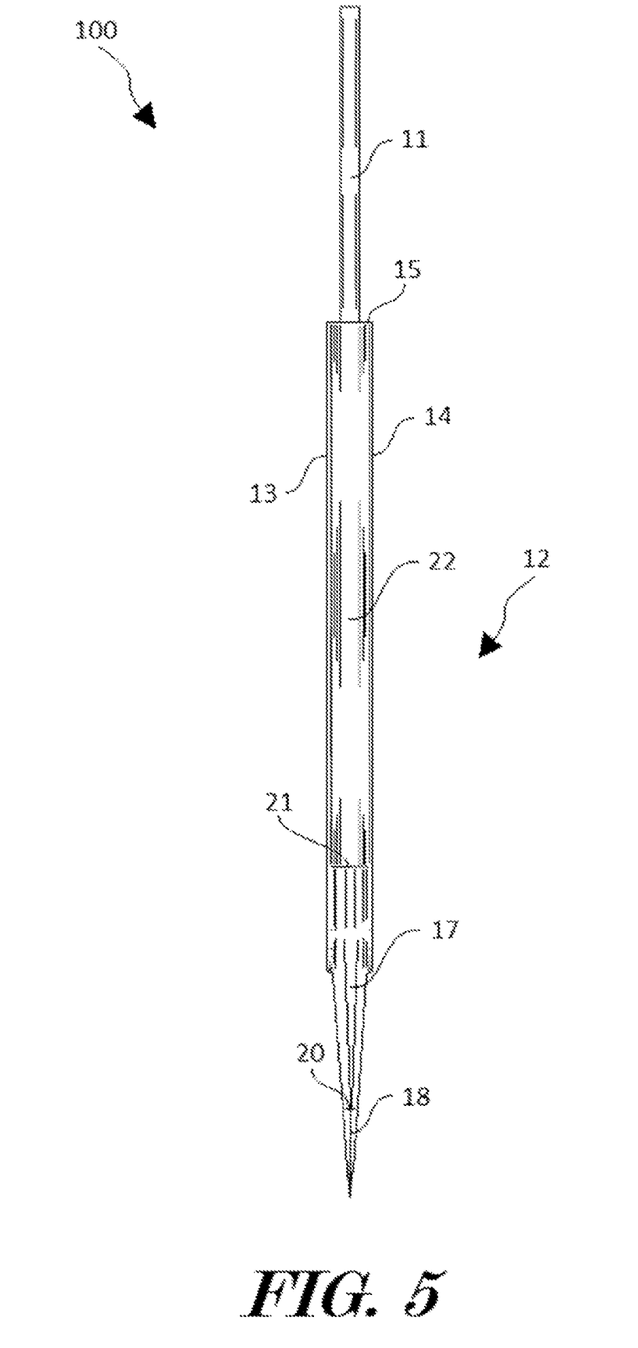
FIG. 5 illustrates an top view of the side of an example of a improved spatula apparatus according to various embodiments described herein.
Figure 6:
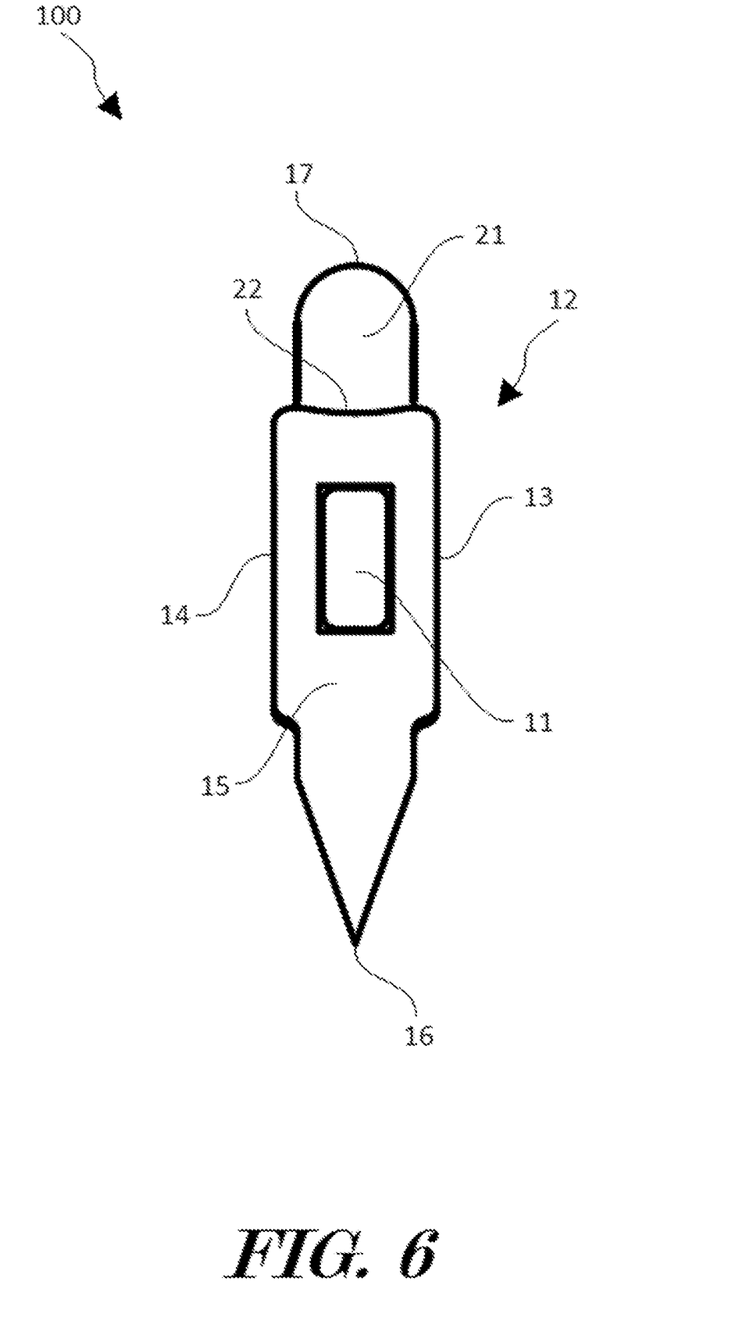
FIG. 6 shows an elevation view of the top of an example of an improved spatula apparatus according to various embodiments described herein.
Figure 7:
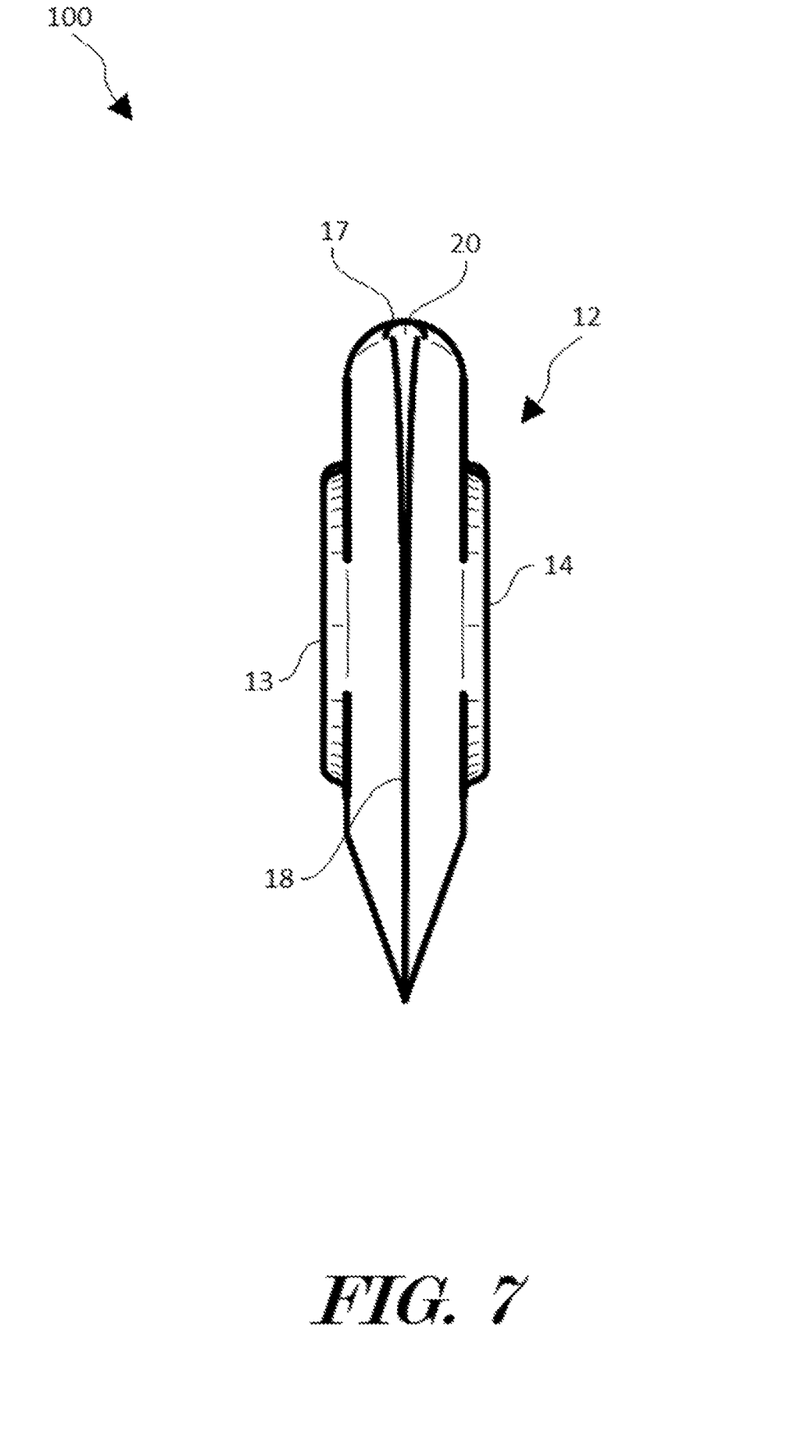
FIG. 7 depicts an elevation view of the bottom of an example of an improved spatula apparatus according to various embodiments described herein.

The front 13 and back 14 of head 12 may also meet at the bottom edge 18 which is disposed on the head 12 opposite the handle 11 and top end 15, with the bottom edge 18 meeting the major side edge 16 at a first corner 19 (FIGS. 1, 2, and 4). In preferred embodiments, the first corner 19 may be configured to be generally pointed in shape with the major side edge 16 and bottom edge 18 meeting at a first angle 119 of approximate right angle or approximately 90 degrees. In still other embodiments, the first corner 19 may be configured to be generally rounded in shape with the major side edge 16 and bottom edge 18 meeting at rounded or blunt tip.

In preferred embodiments, the bottom edge 18 meets the minor side edge 17 at a second corner 20 (FIGS. 1, 2, 4, and 7). In preferred embodiments, the second corner 20 may be configured to be generally rounded or blunt in shape with the minor side edge 17 and bottom edge 18 meeting at a second angle 120 that is generally acute. In some embodiments, the second angle 120 may be between 70-90 degrees. In still other embodiments, the second corner 20 may be configured to be generally pointed in shape with the minor side edge 17 and bottom edge 18 meeting at a second angle 120 of about 90 degrees.

The front 13 and back 14 of head 12 are configured to meet at the major side edge 16, minor side edge 17, and bottom edge 18. The edges where the front 13 and back 14 meet may comprise a plurality of shapes including angled edges, tapered edges, round edges, or square edges. In preferred embodiments, the major side edge 16 may comprise an angled tapered edge forming a pointed edge, the minor side edge 17 may comprise a rounded or blunt edge, and the bottom edge 18 may comprise a tapered edge forming a point with said bottom edge having a curved portion.

The major side edge 16, minor side edge 17, and bottom edge 18 may also be configured in plurality of shapes. In preferred embodiments, the major side edge 16 and minor side edge 17 may be configured a substantially straight or linear shape in a longitudinal direction, while the bottom edge 18 may be configured in a substantially curved or rounded shape. In other embodiments, the major side edge 16 and minor side edge 17 may comprise portions that are substantially straight or linear shape and portions that are substantially curved in shape, while the bottom edge 18 may comprise portions that are substantially straight or linear shaped and portions that are substantially curved in shape. In further embodiments, portions of the major side edge 16, minor side edge 17, and bottom edge 18 that may be curved, may comprise a concave curve or a convex curve, or any combination of concave curves and convex curves.

In preferred embodiments, the spatula 12 head or even portions of handle 11 may comprise a elongate longitudinal groove or grip valley 22 (FIGS. 1, 2, 4-6) which is a substantially concave portion of the head 12 which joins the front 13 of the head 12 and back 14 of the head 12 and preferably opposite the elongate major side edge 16 and extends from the top end 15 to the abutment plateau 21. The elongate longitudinal groove or grip valley 22 may be molded or otherwise configured into the spatula head 12 along one side and made from the same material as the spatula head 12 or it may be made form a different material (e.g. head made from silicone and groove made from plastic) In preferred embodiments, an abutment plateau 21 (FIGS. 1, 2, 4-6) may join the grip valley 22 portion of the head 12 to the minor side edge 17 portion of the head 12, and the abutment plateau 21 may extend slightly out and away from the top more narrow portion of the head 12 to form a wider lower portion of the head 12 as depicted in FIGS. 1, 2, 4-6. In other embodiments, the abutment plateau 21 may comprise a convex shape, concave shape, other types of curved shapes, or a combination of straight and curved shaped portions. In alternative embodiments, the head 12 may be configured without an abutment plateau 21 so that the grip valley 22 meets the minor side edge 17 directly.

The grip valley 22 may preferably be configured to engage one or more fingers of an individual that is holding the apparatus 100. In this regard, the grip valley 22 substantially extends the distance between the front 13 and back 14 forming a gripping edge. The concave shape of the grip valley 22 preferably is configured to provide a shape that is complementary to the convex shape of fingers thereby providing a grip enhancing surface. In other alternative embodiments, the grip valley 22 may comprise a substantially convex shape that extends away from the major side edge 16. In some embodiments, the grip valley 22 may comprise one or more textured portions, such as grooves, ridges, bumps, and the like, thereby providing a grip enhancing surface. In further embodiments, the grip valley 22 may comprise a substantially planar surface. In still further embodiments, the grip valley 22 may comprise one or more portions that are convex, concave, planar, and/or textured.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An improved spatula apparatus, the apparatus comprising:
   a. a handle;
   b. a spatula head coupled to the handle; wherein the spatula head comprises;
      a bottom edge forming a lower terminal edge of the spatula head;
      an elongate major side edge extending along a first vertical side of the spatula head from the handle to the bottom edge;
      a second vertical side opposite to said first vertical side with said second vertical side having an abutment plateau and a minor side edge extending along the second vertical side of the spatula head from the abutment plateau to the bottom edge; and
      a concave grip valley extending longitudinally along the second vertical side of the spatula head from the handle to the abutment plateau with said grip valley being positioned along the second vertical side opposite to the elongate major side edge and being further positioned in-between a front side and a back side of the spatula head; and
   wherein the spatula head has a longitudinal length greater than or equal to the longitudinal length of the handle.

2. The apparatus of claim 1 wherein the elongate major side edge extends longitudinally along at least half of an elongate side of the apparatus.

3. The apparatus of claim 1 wherein the elongate major side edge is formed by the joining of the front side of the spatula head and the back side of the spatula head in a tapered manner forming a pointed end zone.

4. The apparatus of claim 1 wherein the minor side edge is configured to extend less than half of the longitudinal distance of the apparatus.

5. The apparatus of claim 1 wherein the minor side edge is configured to extend about half the longitudinal distance of the elongate major side edge.

6. The apparatus of claim 1 wherein the elongate major side edge joins the bottom edge at a first angle which is substantially a right angle forming a pointed corner.

7. The apparatus of claim 1 wherein the minor side edge joins the bottom edge forming a rounded corner.

8. The apparatus of claim 1 wherein the concave grip valley is contoured to receive the convex shape of a user's fingertip thereby providing an improved gripping surface.

9. The apparatus of claim 1, wherein the abutment plateau protrudes out and away from the concave grip valley to join the minor side edge.

10. The apparatus of claim 1, wherein the elongate major side edge terminates at a tapered pointed end zone with said tapered pointed end zone configured to be used as a squeegee.

* * * * *